Feb. 15, 1966  J. V. MOLONEY  3,234,910
AUTOMATIC LIQUID LIVESTOCK FEEDER
Filed Jan. 29, 1964   3 Sheets-Sheet 1

James V. Moloney
INVENTOR.

BY *Clarence A. O'Brien*
*and Harvey B. Jacobson*
Attorneys

Feb. 15, 1966        J. V. MOLONEY        3,234,910
AUTOMATIC LIQUID LIVESTOCK FEEDER
Filed Jan. 29, 1964                                3 Sheets-Sheet 2
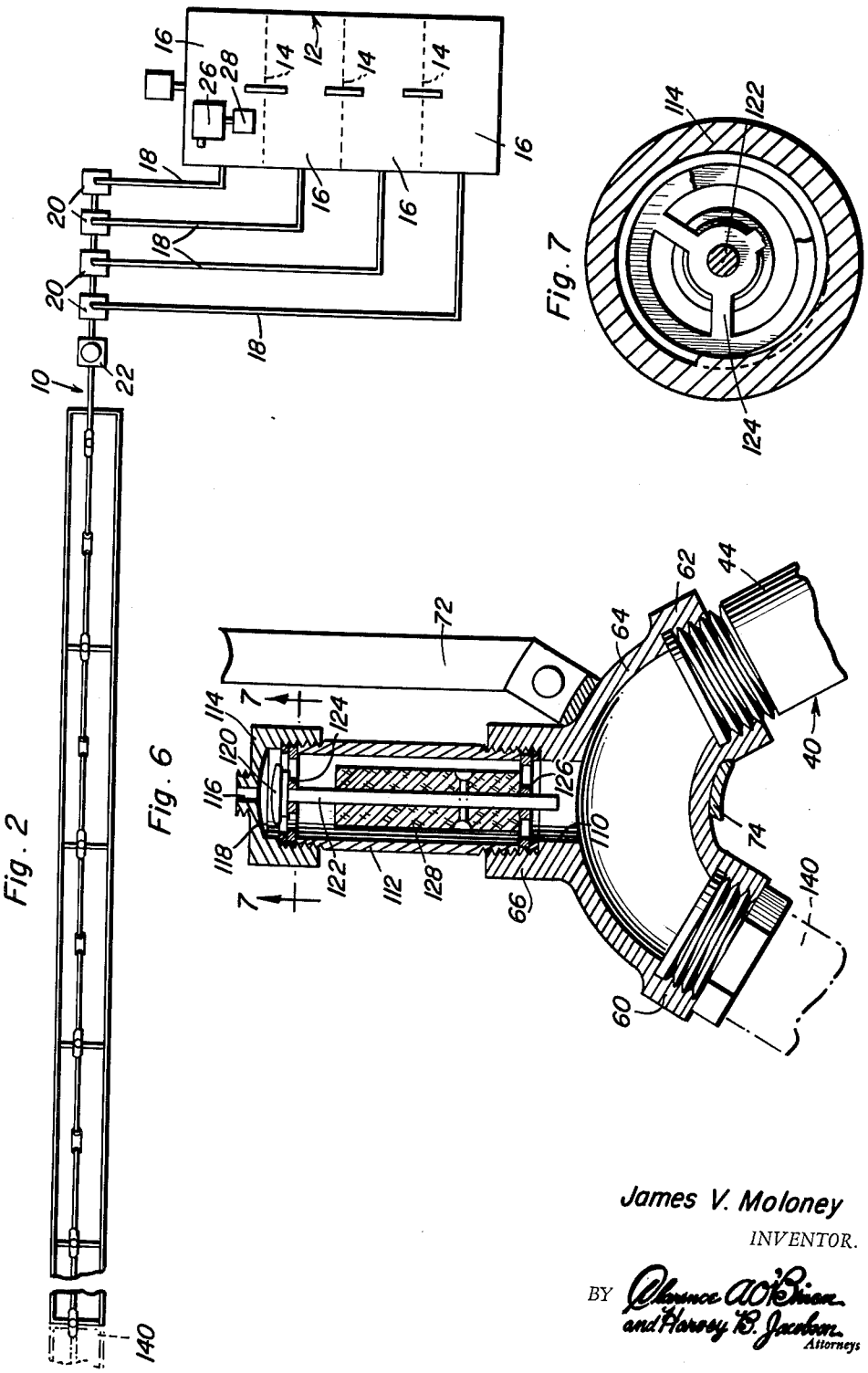
James V. Moloney
INVENTOR.

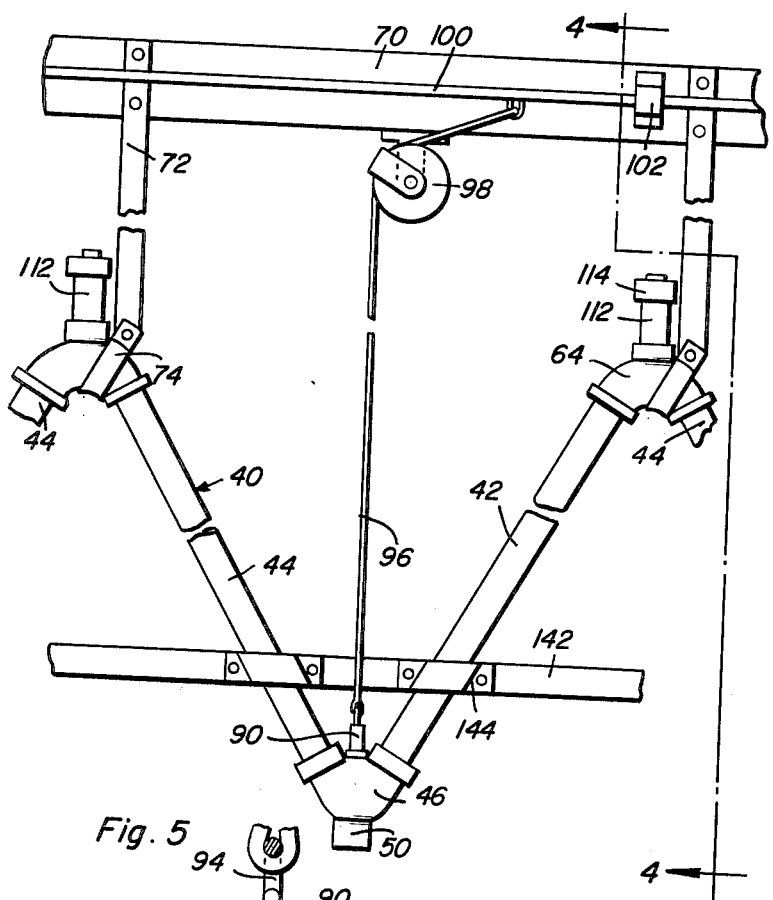
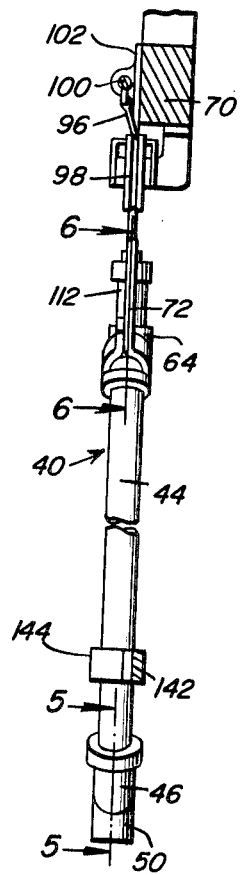
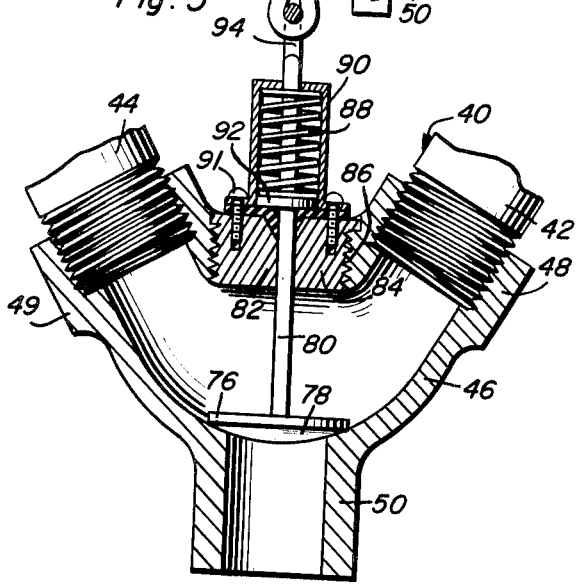

United States Patent Office 3,234,910
Patented Feb. 15, 1966

1

3,234,910
AUTOMATIC LIQUID LIVESTOCK FEEDER
James V. Moloney, Rte. 1, Moxee City, Wash.
Filed Jan. 29, 1964, Ser. No. 341,070
15 Claims. (Cl. 119—51.11)

The invention comprises a novel and useful automatic liquid livestock feeder and more particularly pertains to an apparatus for the automatic feeding of livestock with liquid feed in controlled quantities and at controlled time intervals.

The primary object of this invention is to provide an apparatus to effect the automatic feeding of liquid feed at controlled time intervals to a plurality of animals with no labor being required at the time of the feeding.

A further object of the invention is to provide an automatic feeder in accordance with the preceding object wherein all of the animals may be fed at the same time.

A still further purpose of the invention is to provide an apparatus in compliance with the foregoing objects which will enable the individual feedings to be regulated by direct control of the volume of the feed supplied rather than by the conventional practice of controlling the duration of time during which the feed is supplied.

Still another object of the invention is to provide an apparatus in compliance with the foregoing objects which shall be of a simplified construction and yet will assure accuracy in the measure of the feed supplied to each feeding station and with a very simple control therefor.

Still another purpose of the invention is to provide an apparatus in accordance with the above-mentioned objects which shall include provision for storing of feed at the feeding site whereby a lower pumping capacity for the liquid feed equipment may be utilized for the simultaneous supplying of relatively large quantities of feed to a large number of animals, thereby eliminating the time factor in the supplying of the feed from the source of supply to the individual feeding sites.

An additional object of the invention is to provide an apparatus in conformity with the above-mentioned objects which shall include a plurality of feeding units, each at one of the feeding sites, and which units are disposed serially in a feed supply pipe.

Yet another purpose of the invention is to provide an apparatus in compliance with the preceding objects in which vertically extending storage units are provided in a feed pipe with separate dispensing valves at the lower end of each unit and an air vent valve at the upper end thereof.

A still further and more specific object of the invention is to provide a device in compliance with the preceding objects which shall include time controlled operating means for the dispensing valves.

A still further object of the invention is to provide an apparatus in compliance with the foregoing objects wherein the vent valves shall be float controlled in response to the level of the liquid feed in each unit.

Yet another purpose of the invention is to provide an apparatus which will enable the use of air pressure at the vent valve of each unit to replace and/or supplement gravity in the dispensing of feed from the unit at the desired site.

A still further object of the invention is to provide an apparatus in which varying quantities of feed may be dispensed by merely varying the size and thus the volumetric capacity of the pipes in each unit.

And a final important object of the invention to be specifically enumerated herein resides in the provision of apparatus which shall be capable of manual operation and yet also shall in the event of an emergency be capable of being manually operated to simultaneously dispense the selected quantity of feed at each of the feeding sites.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a horizontal sectional view taken substantially upon the plane indicated by the broken section line 2—2 of FIGURE 1;

FIGURE 3 is a fragmentary view in side elevation and upon an enlarged scale of one of the feeding units of the feeding system;

FIGURE 4 is a view in vertical transverse section taken substantially upon the plane indicated by the broken section line 4—4 of FIGURE 3;

FIGURE 5 is a detail view through the feed dispensing valve of a feeding unit, being taken upon an enlarged scale in vertical section substantially upon the plane indicated by the section line 5—5 of FIGURE 4;

FIGURE 6 is a detail view through a venting and metering valve of a feeding unit being taken upon an enlarged scale in vertical section substantially upon the plane indicated by the section line 6—6 of FIGURE 4; and FIGURE 7 is a detail view in horizontal section taken substantially upon the plane indicated by the section line 7—7 of FIGURE 6.

Figure 1:
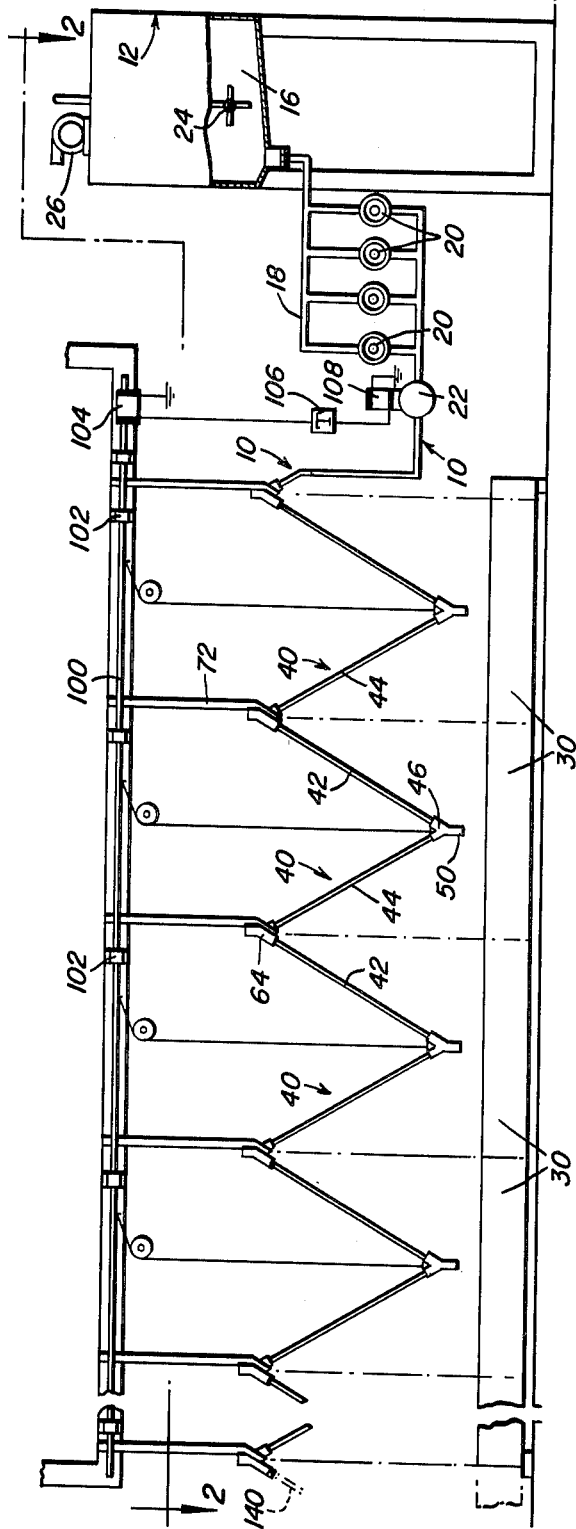
FIGURE 1 is a side elevational view, partly diagrammatic, of an exemplary embodiment of the invention with parts being broken away and other parts being shown in section.

Referring primarily to FIGURES 1 and 2 it will be observed that the liquid feeding system in accordance with this invention includes a liquid feeding or delivery conduit indicated generally by the numeral 10 and which has its inlet end connected to and in communication with a source of liquid fuel such as a hopper or storage tank 12. As suggested in FIGURE 1, the storage tank is preferably elevated with respect to the feed conduit 10 in order that the influence of gravity may assist in or supply the motive agent for delivering the liquid feed from the storage tank to the delivery conduit. As shown in dotted lines in FIGURE 2 a plurality of partitions 14 may be provided in the tank thereby dividing the latter into separated storage compartments 16 and a branch conduit as at 18 connects each of these compartments with the feed conduit 10 as by suitable control valves 20. A master control valve as at 22 may be provided for cutting off fuel for the entire delivery conduit or for controlling the rate of the feed from the source to the delivery conduit.

Shown at 24 in FIGURE 1 is an agitating means of any suitable character which is preferably power operated for the purpose of maintaining a homogeneous mixture of the liquid feed within the storage tank. If desired, pressure may be applied to the storage tank and to the individual compartments 16 thereof as by means of a suitable pump 26 driven as by an electric motor 28 for applying air under pressure to the interior of the tank or to selected compartments thereof or to provide other suitable pressure for effecting the forced flow of the liquid feed from the storage tank and through the feed conduit 10. Inasmuch as the details of the pump and electric motor in themselves form no part of the invention set forth and claimed hereinafter, but are well understood by those skilled in the art, a further description thereof is deemed to be unnecessary.

Referring further to FIGURE 1, it will be seen that the feed conduit 10 extends horizontally and longitudinally from the storage tank 12 to any desired distance, and along its length is associated with a plurality of feed receptacles each of which is indicated by the numeral 30. Each of these receptacles comprises a trough or other suitable feed station or feed site for the liquid feed and is positioned for access by one or a group of livestock to be fed thereby. Inasmuch as the details of the structure and mounting of the feed receptacles form no part of this invention a further description thereof is deemed to be unnecessary.

With continuing reference to FIGURE 1, it will be observed that the feed conduit 10 is provided with a plurality of successively longitudinally disposed and spaced units each of which is indicated generally by the numeral 40.

Referring also to FIGURES 3, 5 and 6, it will be noted that each of the units 40 is of a V-shaped configuration although it may be U-shaped if desired. Each unit consists of a pair of vertically extending conduit sections 42 and 44 which at their lower ends are joined and placed in communication as by a valve fitting 46. Referring to FIGURE 5 it will be observed that the valve fitting 46 is a Y-shaped body having a pair of internally threaded upwardly extending and relatively diverging bosses as at 48 and 49 in which are received the threaded lower ends of the sections 42 and 44. Depending from the lower portion of the body 46 is a discharge duct 50 which is either disposed directly above one of the receptacles 30 or is otherwise placed in communication therewith for discharging the liquid feed from the unit into that receptacle. It will be understood that there is provided one such unit 40 fo reach of the receptacles 30.

At their upper ends, the sections 42 and 44 are connected to the corresponding sections 44 and 42 respectively of the adjacent units 40 so that there is provided a continuous serpentine or succession of upwardly and downwardly directed V-shaped pairs of pipe sections as shown in FIGURE 1.

Referring now to FIGURE 6, it will be observed that the upper ends of the sections 42 and 44 in turn have their threaded extremities disposed in the internally threaded bosses 60 and 62 of the upwardly directed and inverted Y-shaped fittings 64 which thus establish communication between these sections. An upstanding tubular boss 66 at the highest portion of the fitting 64 provides a vent opening for a purpose which will be later set forth.

The delivery conduit 10 is maintained in proper horizontal position above the receptacles 30 by means of a suitable supporting frame 70 disposed thereabove having depending straps 72 with clamps 74, each clamp engaging one of the fittings 64 and thus supporting the series of units 40.

Referring now again to FIGURE 5, it will be noted that the discharge duct 50 is provided with a discharge valve seat 76 therein which is controlled by a suitable discharge valve 78 having an upwardly extending valve stem 80. The latter extends through a bore 82 formed in a removable plug 84 threadedly engaged in a bore 86 in the uppermost portion of the fitting 46. A valve closing spring 88 is provided within a valve spring housing 90 which is secured by fastening bolts 91 to the fitting plug 84, the spring bearing against the upper wall of the valve spring housing 90 and against a collar or enlargement 92 on the valve stem. The upwardly projecting end of the valve stem is provided with an eye 94 to which is engaged the end of a lift cable 96. The latter is entrained over a suitable pulley 98 carried by the support 70 and which pulley is secured to a control rod 100. This rod provides a common control means for all of the control valves and is suitably journaled as at 102 upon the support 70. The control shaft or rod 100 may thus be given motion by any suitable means in order to tension the lift cables 96 and thus open the control valves 78 against the action of their closing springs 88. When the valves are open, the liquid feed filling the conduit sections 42 and 44 of each of the units 40 is discharged therefrom into the receptacles 30. The shaft 100 may be shifted axially in order to effect the desired actuation of the lift cables 96. As shown in FIGURE 1, the end of the lift shaft is provided with a solenoid member 104 which upon being actuated as by an automatic timing device 106 of any desired character, serves to impart shifting movement to the shaft and thus to either open or close the associated control valves of the individual units 40.

The timing device is also connected to a solenoid 108 cooperating with the control valve 22. The arrangement is such that when the timer actuates the shaft 100 to effect the opening of the control valves and thus discharge the liquid feed to the receptacles 30, the valve 22 will be closed. Upon closure of the control valves, the valve 22 will be opened so that the source of its supply may again charge the feed conduit and the associated units 40 each of which comprises thus a storage and dispenser unit for the liquid feed.

The timer control means 106 may be of any desired character, it being merely necessary that it shall be adjustable to effect actuation of the common control shaft 100 and of the liquid feed control valve 22 in alternation at adjustably timed intervals. Inasmuch as the details of the timer control means in itself form no part of the invention set forth and claimed hereinafter, but may be of any conventional and well known design or construction, a further description thereof is deemed to be unnecessary.

Referring now to FIGURE 6 it will be observed that the top of each of the units is provided with the vent means 66. This constitutes a venting port 110 having a vent valve cage or housing 112 screw-threadedly engaged therein and provided with a closure cap 114 at its upper end provided with a vent or orifice 116 open to the atmosphere.

It will be observed that the underside of the cap 114 provides a valve seat 118 with which cooperates an upwardly closing valve 120 having a valve stem 122. The valve stem is guided in suitable spiders 124 and 126 at the top and bottom respectively of the valve housing 112 and a float in the form of a cylindrical body 128 surrounds and is fixedly secured to the valve stem 122 within the confines of the housing 112 and between the guides 124 and 126.

The arrangement is such that when liquid feed is being supplied to the conduit 10, it will fill each of the units 40. As each of the units is filled, the rising liquid level therein will discharge any air accumulating in the units outwardly through the vent opening 116. As the liquid level rises, it will lift the float 128 and thus close off the vent opening 116 by seating the valve 120 upon the valve seat 118. At this time, each of the units will now be fully charged with a supply of the liquid feed sufficient to afford one measured charge into the associated receptacle 30.

When the discharge valves are opened by the actuating means under the influence of the common control means, the weight of the liquid stored in the upwardly extending sections 42 and 44 will cause the liquid supply to be discharged through the discharge spout 50 into the receptacles. As the liquid level drops, the float 128 will drop and the vent valve 120 now be opened permitting the inflow of air to assist in completely evacuating the contents of each unit.

It will thus be apparent that all of the units may be simultaneously operated to discharge their contents thereby supplying a predetermined quantity of feed to each and every one of the receptacles 30. This involves no manual labor inasmuch as the entire discharging operation is automatic and all of the units are discharged simultaneously.

A very important feature of the invention is that the predetermined charge of feed is stored above and at the vicinity of each of the receptacles 30 in readiness for discharge therefrom. Consequently, if the mechanism should fail for any reason, it is still possible to manually operate the individual control valves by lifting the associated cable 96 or by shifting the common control shaft 100 to effect the discharging operation.

A very important feature of the invention resides in the fact that the rate of discharge of the feed simultaneously at all of the stations may be as rapid as desired and does not impose any limit upon the size of the feed delivery system and the pump or motor associated therewith. This advantage is obtained inasmuch as once the control valves have been opened and the accumulated feed discharged at the individual feeding stations, and the control valve is then allowed to close, the automatic timer will then initiate refilling of the system with liquid feed from the storage tank 12. This recharging of the system may be at a relatively slow rate inasmuch as it continues until the desired accumulation of charge has been obtained for each of the stations.

It will of course be apparent that the quantity of the feed stored and discharged can be readily varied. This is effected by varying the volume of the units 40 in various desired manners, as for example varying the length or size of the sections 42 and 44, by providing auxiliary storage reservoirs connected therewith and the like.

It will further be appreciated that the system may be extended indefinitely, as suggested by the dotted line showings at 140 in FIGURES 1, 2 and 6.

As shown in FIGURE 3, there may further be provided a supporting or stabilizing structure in the form of a longitudinally extending support member or beam 142 having suitable clamps 144 secured thereto and which engage with the sections 42 and 44 of each of the units 40. The support member 142 is mounted in any suitable manner, not shown, and is optional for the purpose of rigidifying and stabilizing the vertically extending portions of the feed conduit which constitute the units 40.

The influence of gravity or any maintained pressure to which the liquid feed may be subjected in the supply line 10 and units 40 will usually be sufficient to effect the discharge of the liquid feed when the discharge valves 78 are opened.

The plurality of compartments 16 in the hopper 12 with their valve controlled conduits 18 afford the advantages of providing reserve supplies of feed and even more important enable different feed components to be proportionately mixed and delivered to the supply line 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A liquid feeding system for livestock comprising a source of liquid feed and a feed supply conduit connected thereto, a plurality of feeding receptacles disposed serially along said conduit, said conduit including therein a plurality of successive units each storing and dispensing a predetermined quantity of liquid feed and each unit being disposed adjacent a receptacle for discharging feed thereto, a discharge valve in each unit controlling the discharge of liquid feed stored therein into an associated receptacle, each unit comprising a pair of vertically extending conduit sections having their lower ends connected and said discharge valve connected to said connected lower ends, the adjacent conduit sections of adjacent units having the upper ends joined, and an air vent opening controlled by an air vent valve disposed in each pair of said conduit sections joined upper ends.

2. The combination of claim 1 wherein said air vent valve includes a liquid level float connected thereto and biasing it to vent closing position, said float being gravity actuated to move said air vent valve to vent opening position.

3. The combination of claim 1 including an actuating means for each discharge valve.

4. The combination of claim 3 including a common control means connected to each actuating means.

5. The combination of claim 4 wherein said common actuating means includes a control rod, lift cables operatively connected to said control rod and each connected to a discharge valve, each discharge valve being spring urged downwardly to valve closing position and being lifted to valve opening position by said lift cables.

6. A liquid feeding system for livestock comprising a source of liquid feed and a feed supply conduit connected thereto, a plurality of feeding receptacles disposed serially along said conduit, said conduit including therein a plurality of successive units each storing and dispensing a predetermined quantity of liquid feed and each unit being disposed adjacent a receptacle for discharging feed thereto, a discharge valve in each unit controlling the discharge of liquid feed stored therein into an associated receptacle, each unit comprising a pair of vertically extending conduit sections having their lower ends connected and said discharge valve connected to said connected lower ends, the adjacent conduit sections of adjacent units having the upper ends joined, actuating means for each discharge valve, and common control means connected to each actuating means, said control means including a control rod, with cables operatively connected to said control rod and each connected to a discharge valve, each discharge valve being spring urged downwardly to a valve closing position and being lifted to valve opening position by said lift cables.

7. A liquid feeding system comprising a source of liquid feed, a feed supply conduit connected to said source, said conduit comprising a serpentine continuous member having alternate peaks and valley sections, a discharge valve disposed in each valley section for controlling the discharge of liquid feed stored in said conduit, a plurality of feeding receptacles disposed along said conduit adjacent said valley sections for receiving said liquid feed, and a common control means connected with each discharge valve for simultaneously opening all of said discharge valves.

8. The combination of claim 7 wherein said serpentine conduit is supported at at least one peak section.

9. The combination of claim 7 wherein said common control means includes a control rod, lift cables operatively connected to said control rod and each connected to a discharge valve, each discharge valve being spring urged downwardly to a valve closing position and being lifted to a valve opening position by said lift cables.

10. The combination of claim 9 wherein said lift cables divide the included angle between successive peak sections of said conduit into two substantially equal angles whereby the force transmitted by said lift cables to said discharge valves will be directed substantially vertically thereby insuring that said discharge valves will be readily opened.

11. The combination of claim 7 including an air vent opening controlled by an air vent valve disposed in each peak section.

12. The combination of claim 11 wherein said air vent valve includes a liquid level float connected thereto and biasing it to vent closing position, said float being gravity actuated to move said air vent valve to an opening position.

13. The combination of claim 7 including a time controlled device connected to said common control means and operable to effect actuation of the latter at predetermined time intervals.

14. The combination of claim 7 including a time controlled device connected to said common control means and to said conduit and operable to effect actuation of said common control means at predetermined time intervals for discharging said units into said receptacles and operable to replenish the liquid feed of said units from said source between periods of discharge of said units.

15. The combination of claim 14 including means for delivering liquid feed from said source to said conduit under pressure and under the control of said time control means.

References Cited by the Examiner

UNITED STATES PATENTS 2,929,356   3/1960   Bacigalupo _____ 119—51
3,144,173   8/1964   France et al. _____ 119—56 X SAMUEL KOREN, Primary Examiner.

HUGH R. CHAMBLEE, Examiner.